(12) United States Patent
Chang et al.

(10) Patent No.: US 12,384,674 B1
(45) Date of Patent: Aug. 12, 2025

(54) MAGNESIUM@HIGH-SULFUR COKE HYDROGEN STORAGE MATERIAL AND PREPARATION METHOD THEREOF

(71) Applicants: SHANDONG UNIVERSITY, Qingdao (CN); QINGDA LOW CARBON GREEN HYDROGEN INDUSTRIAL TECHNOLOGY RESEARCH INSTITUTE (QINGDAO) CO., LTD., Qingdao (CN); QINGDAO DANENG ENVIRONMENTAL PROTECTION EQUIPMENT CO., LTD., Qingdao (CN)

(72) Inventors: Jingcai Chang, Qingdao (CN); Yulin Huang, Qingdao (CN); Yang Zhang, Qingdao (CN); Yong Wang, Qingdao (CN); Lianhai Zhang, Qingdao (CN); Xin'an Zhang, Qingdao (CN); Wei Zhang, Qingdao (CN); Haoran Wu, Qingdao (CN); Yiming Wang, Qingdao (CN)

(73) Assignees: SHANDONG UNIVERSITY, Qingdao (CN); QINGDA LOW CARBON GREEN HYDROGEN INDUSTRIAL TECHNOLOGY RESEARCH INSTITUTE (QINGDAO) CO., LTD., Qingdao (CN); QINGDAO DANENG ENVIRONMENTAL PROTECTION EQUIPMENT CO., LTD., Qingdao (CN)

( * ) Notice: Subject to any disclaimer, the term of this patent is extended or adjusted under 35 U.S.C. 154(b) by 0 days.

(21) Appl. No.: 19/011,918

(22) Filed: Jan. 7, 2025

(30) Foreign Application Priority Data

Apr. 22, 2024 (CN) .......................... 202410486481.5

(51) Int. Cl.
  *C01B 3/00* (2006.01)
  *C01B 32/348* (2017.01)

(52) U.S. Cl.
  CPC .......... *C01B 3/0078* (2013.01); *C01B 3/0084* (2013.01); *C01B 32/348* (2017.08)

(58) Field of Classification Search
  None
  See application file for complete search history.

(56) References Cited

U.S. PATENT DOCUMENTS

| 8,980,788 B2 * | 3/2015 | Minoda ................ B01J 20/3248 |
| | | 502/417 |
| 2009/0289222 A1 * | 11/2009 | Wagemans .......... C22C 32/0084 |
| | | 427/398.1 |
| 2012/0215013 A1 * | 8/2012 | Minoda ................ C01B 32/342 |
| | | 562/405 |

FOREIGN PATENT DOCUMENTS

| CN | 107091569 A | * | 8/2017 | ............... C01B 6/04 |
| CN | 112777564 A | * | 5/2021 | |

* cited by examiner

*Primary Examiner* — Joseph D Anthony
(74) *Attorney, Agent, or Firm* — IPRO, PLLC (57) ABSTRACT

The present invention disclosures a magnesium@high-sulfur coke hydrogen storage material and a preparation method thereof. The method comprises: ball milling magnesium powder with high-sulfur coke in an inert atmosphere to obtain a mixture; subjecting the mixture to pressing to form a pressed tablet, followed by melt infiltration in an inert atmosphere to obtain an infiltrated product and a magnesium vapor; and subjecting the infiltrated product to adsorption and condensation of the magnesium vapor to obtain the magnesium@high-sulfur coke hydrogen storage material. The prepared magnesium@high-sulfur coke has low plateau temperature, high hydrogen storage capacity, fast hydrogen absorption/desorption rate, and other advantages.

7 Claims, 5 Drawing Sheets

MAGNESIUM@HIGH-SULFUR COKE HYDROGEN STORAGE MATERIAL AND PREPARATION METHOD THEREOF

CROSS-REFERENCE TO RELATED APPLICATIONS

The present invention claims priority to Chinese Patent Application No. 202410486481.5, filed with the China National Intellectual Property Administration on Apr. 22, 2024 and entitled "MAGNESIUM@HIGH-SULFUR COKE HYDROGEN STORAGE MATERIAL AND PREPARATION METHOD THEREOF", which is incorporated herein by reference in its entirety and forms a part of the present invention for all purposes.

TECHNICAL FIELD

The present invention relates to the technical field of hydrogen storage materials, and specifically provides a magnesium@high-sulfur coke hydrogen storage material and a preparation method thereof.

BACKGROUND OF THE INVENTION

The statements in this section merely provide background related to the present invention and do not necessarily constitute the prior art.

Magnesium, as an ideal high-density hydrogen storage material with abundant reserves, low cost, and light weight, is one of the development directions for future high-density storage. However, magnesium-based hydrogen storage materials suffer from high hydrogen absorption/desorption plateau temperature and slow kinetics. Additionally, magnesium's high chemical reactivity (surface easily oxidizes to form magnesium oxide film) limits its application. While nanosizing magnesium can significantly improve the hydrogen absorption/desorption characteristics of magnesium-based systems, challenges remain including particle size stability and poor cycling performance. The nanoparticles easily agglomerate and grow during activation, phase flow, friction, and hydrogen absorption/desorption thermal effects, leading to deactivation.

The preparation of a nano magnesium-based hydrogen storage material by using functional carbon such as carbon nanotubes as a matrix to confine molten liquid-phase magnesium at nanoscale is considered to be one of the most effective technical solutions, due to the physical isolation and confinement of nano-magnesium particles and the catalytic effects of specific charge transfer, lubrication, and defect structures of the matrix. However, the following problems still need to be further overcome: 1. the preparation process for the matrix is complex and the technical difficulty is high, which severely limits its widespread application. 2. The molecular siphon effect of the carbon pore channels on liquid-phase magnesium is weak, resulting in a low magnesium content within the pores. 3. There is a problem of magnesium evaporation and escape during the confinement process, leading to significant magnesium resource waste.

SUMMARY OF THE INVENTION

In view of the deficiencies in the prior art, an object of the present invention is to provide a magnesium@high-sulfur coke hydrogen storage material and a preparation method thereof.

To realize the above object, the following technical solutions are adopted in the present invention:
according to a first aspect, the present invention provides a method for preparing a magnesium@high-sulfur coke hydrogen storage material, which includes the following steps:
ball milling magnesium powder with high-sulfur coke in an inert atmosphere to obtain a mixture;
subjecting the mixture to pressing to form a pressed tablet, followed by melt infiltration in an inert atmosphere to obtain an infiltrated product and a magnesium vapor; and
subjecting the infiltrated product to adsorption and condensation of the magnesium vapor to obtain the magnesium@high-sulfur coke hydrogen storage material.

The specific confinement process includes three stages. First, high-sulfur coke having a structure with defined pore distribution is used as a milling aid and mixed with magnesium powder for ball milling to obtain a nano-magnesium source of predetermined size, thereby completing the first stage of the design, which involves "gap accommodation of solid-phase nano-magnesium particles" and constructing a network of "solid-phase" nano-magnesium source with a high surface atomic ratio.

Second, through pressure-assisted melt infiltration, solid magnesium particles are melted and enter nanopores of matrix via "molecular siphon" effect, achieving physical isolation and completing second stage "pore filling of liquid-phase nano-magnesium droplets", enhancing "molecular siphon" effect of micro/nanochannels on nano-magnesium droplets.

Finally, escaped magnesium vapor enters temperature-pressure controlled adsorption condensation bed, penetrates through embedded magnesium@high-sulfur coke particle bed layer, and is readsorbed and condensed by massive surface area of system, completing third stage "surface adsorption and condensation of magnesium vapor" and recapturing escaped magnesium vapor.

By using high-sulfur coke as nanoscale confinement matrix, magnesium in "solid, liquid, and gas" phases are confined respectively in "gaps, pores, and surface" spaces of the matrix. The obtained magnesium@high-sulfur coke has the advantages of low plateau temperature, high hydrogen storage capacity, fast hydrogen absorption/desorption rate and the like.

In some embodiments, the high-sulfur coke is prepared by: mixing high-sulfur petroleum coke with an alkali according to a ratio, followed by calcination activation and carbonization in an inert atmosphere, neutralization with an acid, and washing with clean water and drying.

High-sulfur coke is prepared by desulfurization activation with an alkali metal compound, combined with multi-solvent and multi-component atmosphere activation, to achieve a directed structure of pore distribution and surface properties.

The alkali is used for desulfurization and pore-forming activation. Solvents can be water, or an organic reagent, such as ethanol, etc. The atmosphere refers to carrier gas components, which may include water vapor, carbon dioxide, nitrogen, ammonia, and sulfur dioxide, etc.

Preferably, the alkali is KOH or NaOH.

Preferably, a mass ratio of the high-sulfur petroleum coke to the alkali is 1:2-5.

Preferably, the calcination activation and carbonization in the inert atmosphere is conducted at 900-1000° C. for 0.5-1.5 h and preferably 1 h.

Further preferably, a heating rate during the activation and carbonization is 3-8° C./min and preferably 5° C./min.

Preferably, the acid is hydrochloric acid, sulfuric acid, phosphoric acid, or nitric acid.

In some embodiments, a mass ratio of the magnesium powder to the high-sulfur coke is 9:1-20:1.

Preferably, the ball milling is conducted at a ball-to-powder ratio of 40-50:1.

Preferably, the ball milling is conducted for 5-7 h.

In some embodiments, the pressing includes placing the mixture into a pressing mold and pressing at 20-40 MPa for 0.5-1.5 h. Preparing pressed tablet of nano-metal magnesium and high-sulfur coke mixture increases contact area between magnesium and high-sulfur coke, effectively reducing diffusion path and resistance of magnesium melt.

Preferably, pressing is conducted at 30 MPa for 1 h.

In some embodiments, the melt infiltration comprises heating to 656-711° C. and holding at this temperature for 7-85 min.

Preferably, wherein after heating, the melt infiltration further comprises cooling in the inert atmosphere at a cooling rate of 3-10° C./min, and when temperature reaches 300-400° C., the inert atmosphere is replaced with a hydrogen atmosphere to prevent oxidation and allow magnesium to form magnesium hydride for safe retention.

Further preferably, when temperature reaches 200° C., programmed cooling starts until reaching 70-90° C., and then the hydrogen atmosphere is replaced with the inert atmosphere.

Still further preferably, the programmed cooling is conducted at 5-10° C./min.

In some embodiments, the adsorption and condensation are conducted in an adsorption condensation bed by fixing the pressed tablet at a sand core of the adsorption condensation bed, followed by introducing the magnesium vapor generated during the melt infiltration for adsorption; and
  circulating cooling water is introduced to an outer layer of the adsorption condensation bed during the adsorption for condensation.

When adsorption and condensation are complete, magnesium vapor condenses as nano-magnesium crystals on product surface, and sample can then be removed.

According to a second aspect, the present invention provides a magnesium@high-sulfur coke hydrogen storage material prepared by the above-mentioned method.

The beneficial effects achieved by one or more embodiments of the present invention are as follows:
  1. The nanoscale effect of magnesium is significantly improved. The preparation of nano magnesium grains with a suitable dimension by ball milling using high-sulfur coke as an aid lays a foundation for enhancing the "molecular siphon" effect of the nano pores on the magnesium droplets; and the escaping magnesium vapor is adsorbed and condensed again by the large surface of the system, forming nano magnesium crystals with significant nanoscale effect.
  2. The confined storage effect of magnesium clusters is significant. Using massive gaps, pores, and surfaces as confined spaces, and using the same scale of nano magnesium source as a guarantee, magnesium in "gas, liquid, and solid" states are stepwise and orderly stored in the corresponding confined spaces, resulting in significant gains in improving a magnesium loading rate.
  3. The system has a high cyclic stability. By the nano confinement in three levels of space, effective physical isolation of Mg/MgH$_2$ clusters is achieved, which can effectively prevent the oxidation contamination and subsequent aggregation and growth, and significantly improve the thermodynamic properties in hydrogen absorption and desorption of the material.
  4. The material has excellent performance and great potential for use. The magnesium@high-sulfur coke hydrogen storage material is synthesized by nano confinement of magnesium in "solid, liquid, and gas" phases after ball milling, melt infiltration, adsorption and condensation, with which reversible hydrogen absorption and desorption at <100° C. and at a hydrogen storage capacity close to that of a rare earth material are achieved. By the present invention, a low-cost, scalable, and practical low-temperature magnesium-based composite hydrogen storage material are expected to be constructed.

The high-sulfur petroleum coke, as a major by-product of delayed coking, has a high carbon content and is a potential high-quality and inexpensive carbon precursor. The porous carbon prepared with the high-sulfur coke (referred to as the high-sulfur coke) has great potential as a substitute for a functional carbon, such as carbon nanotubes, acting as nano confining matrix.

BRIEF DESCRIPTION OF DRAWINGS

The accompanying drawings constituting a part of the present invention are provided for further understanding for the present invention. Exemplary embodiments of the present invention and descriptions thereof are used for explaining the present invention and do not constitute an improper limitation on the present invention.

In the figure, 1—gas inlet; 2—abrasive plug; 3—water outlet; 4—sand core; 5—water inlet; 6—gas outlet.

DETAILED DESCRIPTION

It should be noted that the following detailed descriptions are all exemplary and are intended to provide a further description of the present invention. Unless otherwise specified, all technical and scientific terms used in the present invention have the same meanings as commonly understood by a person of ordinary skill in the art to which the present invention belongs.

The present invention will be further described below in conjunction with the examples.

The materials used in the examples and comparative examples are all commercially available unless otherwise specified.

EXAMPLE 1

Figure 1:
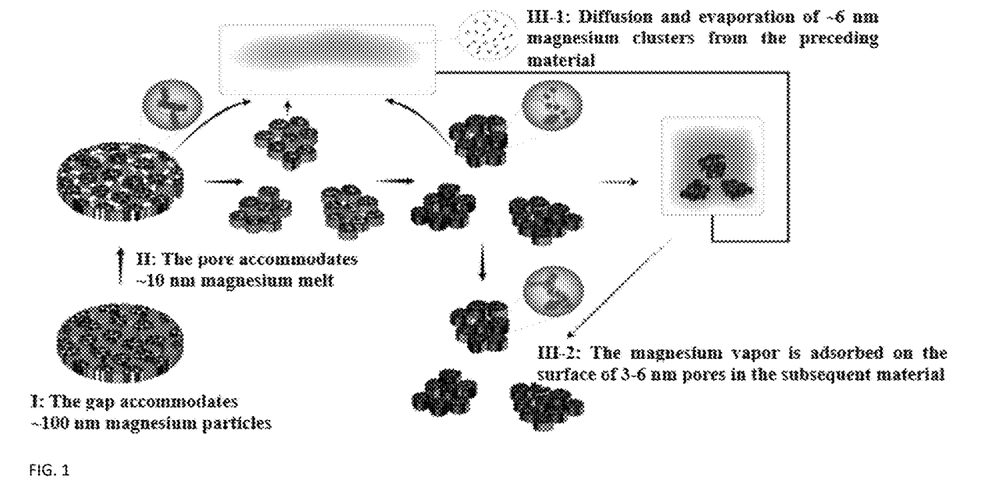
FIG. 1 is a schematic diagram illustrating principles of magnesium@high-sulfur coke hydrogen storage material of the present invention.
Figure 2:
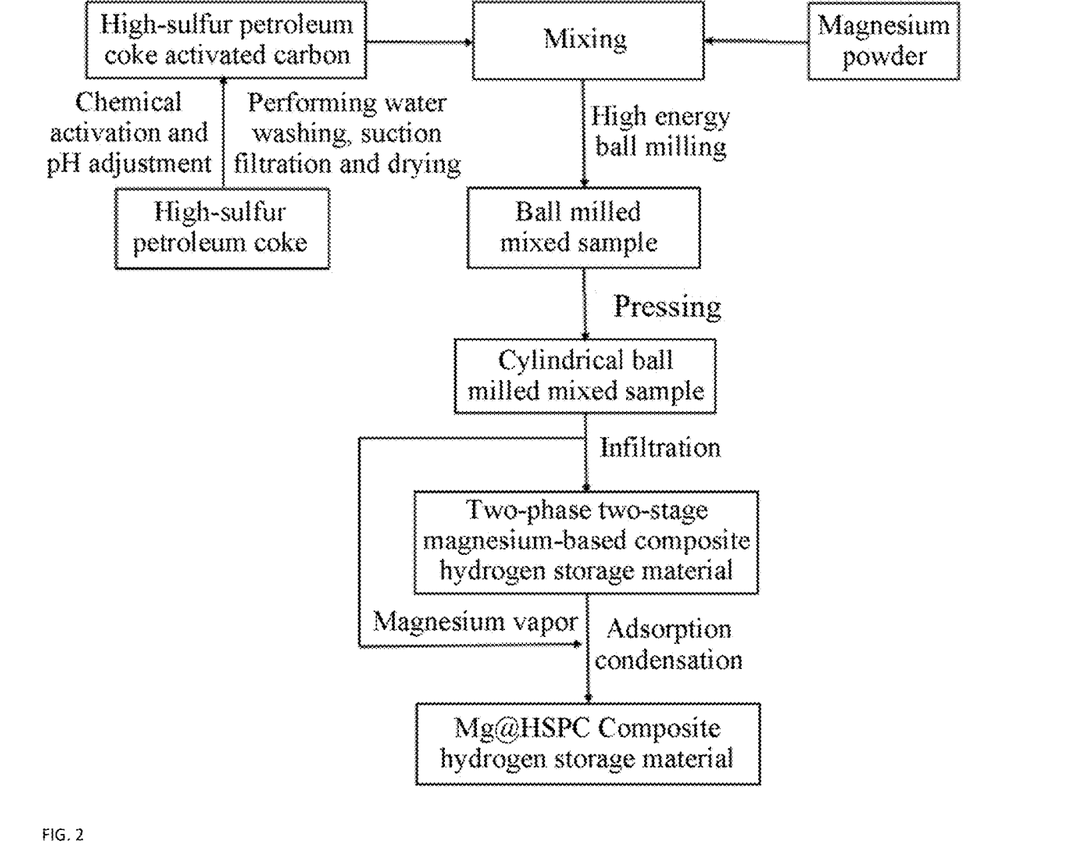
FIG. 2 is a flow chart showing preparation process of magnesium@high-sulfur coke hydrogen storage material of the present invention.

A method for preparing magnesium@high-sulfur coke hydrogen storage material, as shown in the flowchart of FIG. 2, including:

Step 1: Preparation of High-Sulfur Coke

11) High-sulfur petroleum coke was mixed with KOH at a mass ratio of 1:5, and subjected to chemical activation and high-temperature carbonization in a high-purity argon atmosphere in a tubular furnace. The temperature was increased to 1000° C. at a rate of 5° C./min, held at this temperature for 1 hour, and then cooled to room temperature for later use.

12) The prepared high-sulfur coke was neutralized and adjusted to pH=7 with a 1 mol/L HCl solution.

13) Finally, the high-sulfur coke was subjected to repeated suction filtration and water washing, followed by drying to obtain the final sample.

Step 2: Mixing and Ball Milling of Magnesium with High-Sulfur Coke 21) 0.56 g of magnesium powder and 0.06 g of high-sulfur coke powder (used as a milling aid) were placed in a ball mill and ball-milled under an argon atmosphere. The ball-to-powder ratio was controlled at 40:1.

22) The total ball milling time was 6 h, including 30 min of forward rotation, 30 min of reverse rotation, and a 10-minute interval, a rotation speed was 400 rpm, and finally, a mixed sample was removed after milling.

Step 3: Pressing 31) 0.1 g of the high-sulfur coke and 0.3 g of the mixed sample after ball milling were placed in a pressing mold, and pressed at 30 MPa for 1 h.

32) A pressed tablet of the mixture of the nano-metal magnesium and the high-sulfur coke was prepared to increase the contact area between magnesium and the high-sulfur coke, thereby effectively reducing the diffusion path and resistance of the magnesium melt. A cylindrical pressed tablet was then removed.

Step 4: Melt Infiltration

41) The pressed tablet prepared in step 3 was placed in a tubular furnace and subjected to high-temperature sintering in an argon atmosphere, with a heating rate was 5° C./min.

42) The temperature was raised from 20° C. to 666° C., and maintained for 22 min.

43) After that, the temperature was decreased, with a cooling rate of 5° C./min, and when the temperature dropped to around 360° C., the argon atmosphere was replaced by a hydrogen flow.

44) When the temperature dropped to 200° C., programmed cooling was performed, and the hydrogen flow was switched back to the argon atmosphere when the temperature dropped to around 80° C., the remaining hydrogen in the tubular furnace was discharged, and finally the sample was removed.

By carbonization and activation with KOH, a super high-sulfur petroleum coke (HSPC) with a specific surface area of 856.3 m$^2$/g, pore volume of 0.7 cm$^3$/g, an average pore size of 3.3 nm, and micropores of <6 nm accounting for about 50% was prepared. Using this material, a magnesium-based hydrogen storage material with a hydrogen storage rate of 0.6 wt. % and capable of reversible hydrogen absorption and desorption at 100° C. was successfully obtained.

The composite hydrogen storage material prepared in the above example was characterized. Analysis data of the specific surface area, pore volume, and others of the material were obtained by BET analysis. The magnesium loading rate was calculated using the following formula based on the changes in mass and pore volume before and after melt infiltration, as well as the density of magnesium:

$$n=(M_1V_1-M_2V_2)P_{Mg}/[(M_1V_1-M_2V_2)P_{Mg}+M_c];$$

where:

$M_1$ and $M_2$ represent the mass before and after melt infiltration, respectively, in grams (g);

$V_1$ and $V_2$ are the pore volumes before and after melt infiltration, respectively, in cm$^3$/g;

$P_{Mg}$ is the density of magnesium, which is 1.74 g/cm$^3$; and $M_c$ is the mass of the high-sulfur petroleum coke activated carbon, in grams (g).

The magnesium loading rate of the prepared hydrogen storage material was calculated to be 36%. The reason is that the evaporation temperature of the nano-magnesium clusters in pores of <6 nm is much lower than the phase transition temperature of 940±10 K, at which the magnesium particles of about 70 nm held in the gaps are melted to enter the capillary-to micro-channels, resulting in simultaneous evaporation and escape of magnesium in theses pores. The scale effect of the 20-40 nm magnesium particles in the remaining gaps and the nano-magnesium in the pores of about 10 nm is weakened.

EXAMPLE 2

The preparation method of the composite hydrogen storage material in this example is the same as that of Example 1, except that Step 1 and Step 4 are excluded, and the conditions and Steps 2-3 remain unchanged.

Step 1:

11) High-sulfur petroleum coke was mixed with KOH at a mass ratio of 1:5, soaked in 90% anhydrous ethanol and 10% deionized water, ultrasonicated for 2 h, and then removed and dried at 120° C. for later use.

12) High-sulfur petroleum coke was subjected to chemical activation and high-temperature carbonization in a high-purity argon atmosphere in a tubular furnace, by heating up to 1000° C. or 900° C. at a heating rate of 5° C./min, holding at this temperature for 1 h, and then cooling to room temperature for later use.

13) The prepared high-sulfur coke was neutralized and adjusted to pH=7 with a 1 mol/L HCl solution.

14) Finally, the high-sulfur coke was subjected to repeated suction filtration and water washing, followed by drying to obtain the final sample.

Step 4: Melt Infiltration

41) The pressed tablet prepared in step 3 was placed in a tubular furnace and subjected to high-temperature sintering in an argon atmosphere, with a heating rate was 5° C./min.

42) The temperature was raised from 20° C. to 636° C., 651° C., 666° C., 681° C., 696° C., and 711° C. respectively, and maintained for 22 min.

43) After that, the temperature was decreased, with a cooling rate of 5° C./min, and when the temperature dropped to around 360° C., the argon atmosphere was replaced by a hydrogen flow.

44) When the temperature dropped to 200° C., programmed cooling was performed, the hydrogen flow was switched to the argon atmosphere when the temperature dropped to around 80° C., the remaining hydrogen in the tubular furnace was discharged, and finally the sample was removed.

Figure 3:
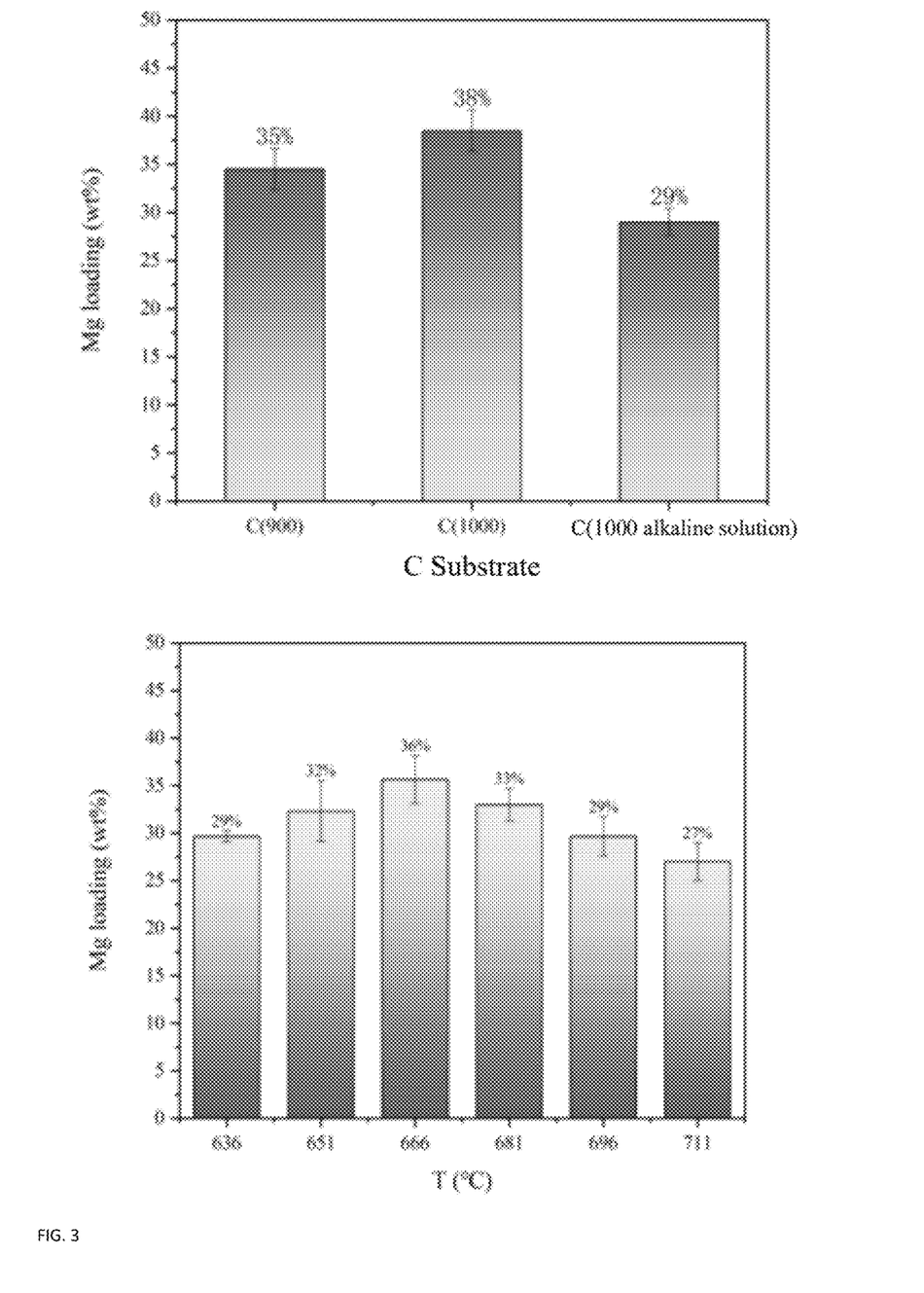
FIG. 3 shows magnesium loading rate data of magnesium@high-sulfur coke hydrogen storage material in Example 2 of the present invention.

As shown in FIG. 3, the Mg@high-sulfur coke with the high-sulfur coke (C (1000)) prepared at 1000° C. as the matrix exhibits the highest magnesium loading rate, reaching up to 38%; and the composite hydrogen storage material prepared by melt infiltration into the high-sulfur coke soaked in an alkaline solution (C(1000 alkaline solution)) has the lowest Mg loading rate, at only 29%.

Therefore, on the basis of Example 1, the influence of the melt infiltration temperature on the loading rate of Mg was investigated. From FIG. 3, it can be seen that as the melt infiltration temperature increases, the magnesium loading rate first increases and then decreases, with the highest loading rate occurring at 666° C.

EXAMPLE 3

Figure 4:
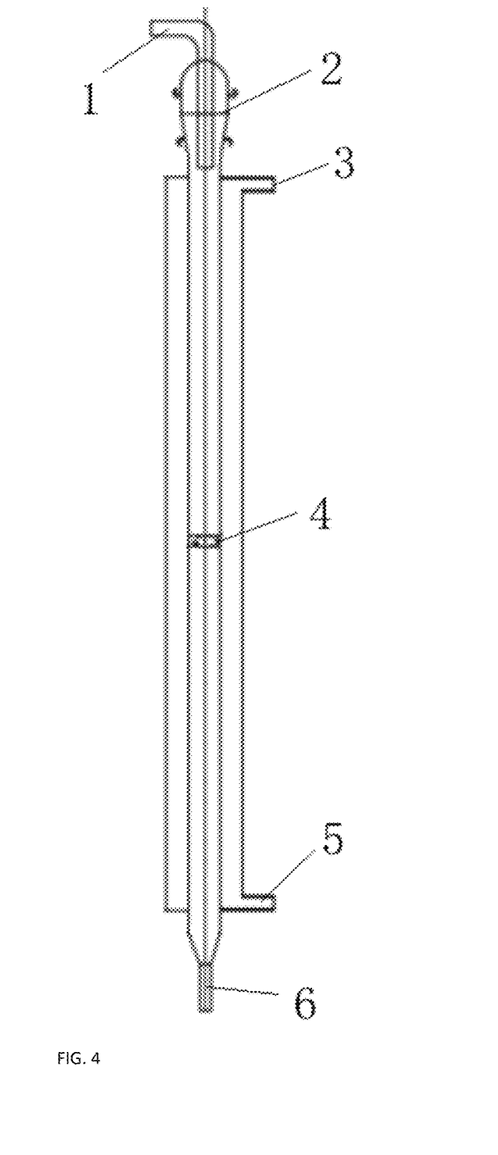
FIG. 4 is a schematic diagram of temperature-pressure controlled adsorption condensation bed in Example 3 of the present invention.

In this example, the composite hydrogen storage material is prepared with the addition of Step 5, while the conditions and Steps 1-4 remain the same as those in Example 1, as follows:

Step 5:

51) Based on step 4, where the magnesium vapor was evaporated, the prepared infiltrated sample in step 4 was placed at ½ of a sand core in an adsorption condensation bed with controlled temperature and pressure in an argon atmosphere, as shown in FIG. 4. The magnesium vapor evaporated in step 4, along with the argon atmosphere, was introduced into the adsorption condensation bed, with an argon flow rate of 150 ml/min. An outer layer of the adsorption condensation bed was cooled by circulating water, flowing in from the bottom and out from the top at a temperature of 20° C. and a flow rate of 500 ml/min. The adsorption and condensation were completed again, and finally the sample was removed.

The magnesium loading rate of the prepared hydrogen storage material was 65%.

Figure 5:
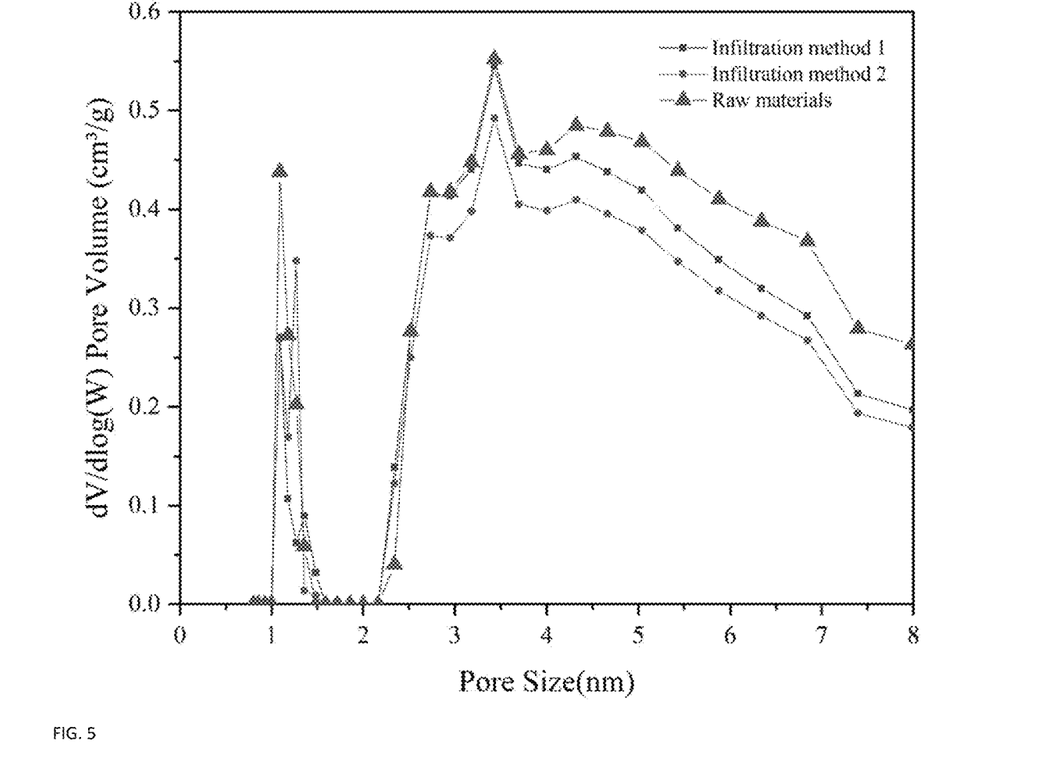
FIG. 5 shows comparison of magnesium@high-sulfur coke hydrogen storage materials prepared in Example 1 and Example 3 of the present invention.

As shown in FIG. 5, when the melt infiltration temperature increased from 636° C. (Infiltration method 1) to 666° C. (Infiltration method 2), the capillary filling effect of magnesium droplets in the pores became significant, and the pore volume per unit mass decreased sharply, where the volume of pores of <2 nm and 4-8 nm decreased at a larger rate. When the temperature was raised to 711° C., the pore volume of the system did not decrease, but increased instead, which was due to the evaporation and escape of almost all of the small-scale nano-magnesium during the confined synthesis. However, after the magnesium@high-sulfur coke hydrogen storage material was prepared by using the three-stage confined loading method, significant changes were achieved compared to the initial result.

In summary, nano-metal magnesium was successfully loaded on high-sulfur coke in the present invention. For solid-phase magnesium, the particle size was controlled to improve the ratio of surface atom. Under the conditions that magnesium equally at the nanoscale was obtained by ball milling, an appropriate proportion of high-sulfur coke was added and used as a millig aid during the ball milling to produce nano-magnesium, to prevent the aggregation and growth of magnesium during the ball milling and greatly improve the ball milling efficiency. Moreover, the lubricating effect of the high-sulfur coke was conducive to the formation of small-sized magnesium particles, whereby magnesium was well ball milled to obtain the nano-magnesium. Through capillary force, van der Waals force and other effects, the molten liquid-phase magnesium constantly and spontaneously entered from high-concentration mesopores and meso-macro pores into a large amount of low-concentration micropores connected thereto. The nano magnesium in the pores was not prone to agglomeration and growth, and was firmly confined within the pores of the high-sulfur petroleum coke activated carbon, thus effectively overcoming the instability of the nano-magnesium. The partial pressure and relative concentration of the magnesium vapor were adjusted, and the pressure inside the adsorption condensation bed, the bed temperature, and the temperature gradient were changed, such that the magnesium vapor was controlled to fully condensed and nucleated during the adsorption, collision, and penetration through the bed layer, to form nano magnesium fine crystals of small grains. The thermodynamic properties of the prepared magnesium@high-sulfur coke hydrogen storage material were significantly improved.

The above-described examples are only preferred examples of the present invention and are not intended to limit the invention. For those skilled in the art, the present invention can be modified in various ways. Any modifications, equivalent substitutions, improvements, etc., made within the spirit and principles of the present invention, should be included within the scope of the invention's protection.

The invention claimed is:

1. A method comprising:
   ball milling magnesium powder with coke in a first inert atmosphere to obtain a mixture;
   forming a pressed tablet by pressing the mixture, followed by melt infiltration in a second inert atmosphere to obtain an infiltrated product; and
   subjecting the infiltrated product to adsorption and condensation of magnesium vapor;
   wherein the method further comprises preparing the coke by: mixing petroleum coke with an alkali, followed by calcination activation and carbonization in a third inert atmosphere, neutralization with an acid, and washing with water and drying;
   wherein the mass ratio of the magnesium powder to the coke is in a range of 9:1 to 20:1;
   wherein the pressing comprises placing the mixture in a pressing mold and pressing the mixture at 20-40 MPa for 0.5-1.5 h;
   wherein the alkali is KOH or NaOH;
   wherein the mass ratio of the petroleum coke to the alkali is in a range of 1:2 to 1:5;
   wherein the calcination activation and carbonization in the third inert atmosphere is conducted at 900-1000° C. for 0.5-1.5 h;
   wherein the heating rate during the activation and carbonization is 3-8° C./min;
   wherein the adsorption and condensation are conducted in an adsorption condensation bed by fixing the pressed tablet at a sand core of the adsorption condensation bed, followed by introducing the magnesium vapor; and
   wherein circulating cooling water is introduced to an outer layer of the adsorption condensation bed during the adsorption and condensation.

2. The method according to claim 1, wherein the acid is hydrochloric acid, sulfuric acid, phosphoric acid or nitric acid.

3. The method according to claim 1, wherein the ball milling is conducted at the ball-to-powder ratio in a range of 40:1 to 50:1 for 5-7 h.

4. The method according to claim 1, wherein the pressing is conducted at 30 MPa for 1 h.

5. The method according to claim 1, wherein the melt infiltration comprises heating the pressed tablet to 656-711° C. for 7-85 min.

6. The method according to claim 5, wherein the melt infiltration further comprises, after heating, cooling the pressed tablet in the second inert atmosphere at a cooling rate of 3-10° C./min, and replacing the second inert atmosphere with a hydrogen atmosphere when the pressed tablet reaches 300-400° C.

7. The method according to claim 6, wherein the melt infiltration further comprises, when the pressed tablet reaches 200° C., further cooling the pressed tablet at a rate of 5-10° C./min, and replacing the hydrogen atmosphere with the second inert atmosphere when the pressed tablet reaches 70-90° C.

* * * * *